United States Patent [19]

Oda et al.

[11] Patent Number: 4,734,170

[45] Date of Patent: * Mar. 29, 1988

[54] ELECTROLYSIS OF AQUEOUS SOLUTION OF SODIUM CHLORIDE

[75] Inventors: Yoshio Oda; Manabu Suhara, both of Yokohama; Eiji Endo, Yamato, all of Japan

[73] Assignee: Asahi Glass, Co., Ltd., Tokyo, Japan

[ * ] Notice: The portion of the term of this patent subsequent to Dec. 27, 1994 has been disclaimed.

[21] Appl. No.: 491,347

[22] Filed: May 10, 1983

Related U.S. Application Data

[63] Continuation of Ser. No. 884,289, Mar. 7, 1978, abandoned, which is a continuation of Ser. No. 719,920, Sep. 2, 1976, abandoned.

[51] Int. Cl.[4] .............................. C25B 1/16; C25B 1/26

[52] U.S. Cl. ...................................... 204/98; 204/128; 204/296

[58] Field of Search .......................... 204/296, 98, 128

[56] References Cited

U.S. PATENT DOCUMENTS 4,065,366 12/1977 Oda et al. .
4,178,218 12/1979 Seko .

Primary Examiner—John F. Niebling
Attorney, Agent, or Firm—Oblon, Fisher, Spivak, McClelland & Maier

[57] ABSTRACT

A diaphragm electrolysis of an aqueous solution of sodium chloride is carried out by using a fluorinated cation exchange membrane which is made of a polymer having carboxylic acid groups as ion-exchange group and has 2.0 to 3.5 mole/Faraday of water permeability under the electrolysis.

9 Claims, No Drawings

ELECTROLYSIS OF AQUEOUS SOLUTION OF SODIUM CHLORIDE

This is a continuation of application Ser. No. 884,289, filed Mar. 7, 1978 and now abandoned, which in turn is a continuation of application Ser. No. 719,920, filed Sept. 2, 1976 and now abandoned.

BACKGROUND OF THE INVENTION

The present invention relates to a novel electrolysis of an aqueous solution of sodium chloride for producing chlorine in an anolyte compartment and sodium hydroxide in a catholyte compartment in high current efficiency.

A diaphragmic electrolysis of an aqueous solution of sodium chloride in two compartments has been known.

In said electrolysis, an anode and a cathode in an electrolytic cell are partitioned with a diaphragm and an aqueous solution of sodium chloride is fed into the anolyte compartment to electrolyze it to produce chlorine in the anolyte compartment and to produce sodium hydroxide in the catholyte compartment.

Heretofore, asbestos has been usually used as a diaphragm. When asbestos diaphragm is used as a diaphragm, sodium chloride is contaminated in the resulting sodium hydroxide whereby the purity is decreased disadvantageously. Moreover, asbestos itself is corroded by a base in high concentration whereby a solution of sodium hydroxide in high concentration can not be obtained.

Accordingly, it has been proposed to use a fluorinated cation exchange resin having a chlorine resistance and a selective permeability for sodium ions as a diaphragm.

When the fluorinated cation exchange membrane is used as a diaphragm, the contamination of sodium chloride in the resulting sodium hydroxide can be prevented because of the ion selectivity thereof.

The methods have been comparatively satisfactory from the viewpoint of purity, however, the current efficiencies have not been satisfactory. According to the experiments by the inventors, the practical current efficiencies in the cases of using the conventional cation exchange membranes have been up to about 80 percent as disclosed in the publications such as U.S. Pat. specification No. 3,773,634. When the concentration of sodium hydroxide has been high, the current efficiencies have been remarkably low.

The unsatisfactory current efficiencies have been caused by a leakage of hydroxyl ions formed in the catholyte compartment through the cation exchange membrane to the anolyte compartment in the condition of electrolysis. However, it has not been known to obtain a membrane and a method which are effective for inhibiting the leakage of $OH^-$ through the cation exchange membrane.

The inventors have studied to produce sodium hydroxide in high current efficiency by the electrolysis of an aqueous solution of sodium chloride by using a cation exchange membrane as the diaphragm.

As the result, the inventors have found novel fact that sodium hydroxide can be produced in unpredictably high current efficiency by controlling a water permeability of the cation exchange membrane in desired range in the electrolysis when the fluorinated cation exchange membrane having carboxylic acid groups as ion-exchange groups is used as the diaphragm.

SUMMARY OF THE INVENTION

It is an object of the present invention to provide an electrolysis of an aqueous solution of sodium chloride to produce sodium hydroxide in high current efficiency by using a fluorinated cation exchange membrane as a diaphragm for partitioning an anolyte compartment and a catholyte compartment in an electrolytic cell.

The object of the present invention has been attained by a diaphragmic electrolysis of aqueous solution of sodium chloride to produce chlorine and sodium hydroxide by using a fluorinated cation exchange membrane having carboxylic acid groups as ion-exchange groups and 2.0 to 3.5 mole/Faraday of water permeability under the electrolysis, as a diaphragm.

DETAILED DESCRIPTION OF THE PREFERRED EMBODIMENT

In the electrolysis of the invention, a fluorinated cation exchange membrane having carboxylic acid groups as ion-exchange groups should be used.

When a fluorinated cation exchange membrane having the other ion-exchange group such as strongly acidic sulfonic acid groups is used, even though the water permeability under the electrolysis is same with that of the invention, the current efficiency is inferior and the current efficiency is remarkably low in the case of the production of a solution of sodium hydroxide in high concentration.

On the other hand, it is novel finding that the current efficiency for producing sodium hydroxide can be remarkably increased by using a fluorinated cation exchange membrane having a specific water permeability under the electrolysis, in the electrolysis of an aqueous solution of sodium chloride using a fluorinated cation exchange membrane. According to the studies of the inventors on the novel findings, the water permeability of the membrane closely relates to the current efficiency. In the case of the fluorinated cation exchange membrane having carboxylic acid groups, the current efficiency is unsatisfactorily low when the water permeability of the membrane is higher or lower than the above-mentioned range.

Thus, the water permeability of the conventional fluorinated cation exchange membrane having carboxylic acid groups is not in the range and in most case is lower than that of the invention.

When the carboxylic acid type fluorinated cation exchange membrane having the lower water permeability is used, the current efficiency is low and the electric resistance of the membrane is high and the power consumption in the electrolysis is increased as shown in the following reference examples.

The mechanism for improving the current efficiency by using the fluorinated cation exchange membrane having the specific water permeability under the electrolysis has not been clearly understood. According to the inventors' consideration, the permeability of the cation exchange membrane in said specific range seemed to be given by controlling the diameters of pores of the membrane i.e. the diameters of passages for ions in a specific range.

According to the consideration, the selective permeability is more imparted for sodium ions with hydrated water than hydroxyl ions, both ions which are countercurrently moved through the pores of the membrane, by the specific ion-exchange groups of the membrane by providing the specific water permeability which relates to the specific diameters of the passages in the membrane.

Accordingly, the permeation of the hydroxyl ions for causing to selectively pass sodium ions through the membrane.

It is considered that the permeation of hydroxyl group ions for causing the decrease of the current efficiency is physically suppressed by the permeation of sodium ions with hydrated water which are countercurrently passed through the pores having the specific diameters when the diameters of the pores are in the specific range.

It has been considered to attain high current efficiency in the production of sodium hydroxide by using the fluorinated cation exchange membrane having a specific permeability according to the above phenomenon. The mechanism is not clearly confirmed.

In accordance with the process of the invention, it is possible to attain higher than 90% of current efficiency even though the concentration of sodium hydroxide reaches to high concentration of 30 to 45 wt. % in the electrolysis of sodium chloride to produce chlorine and sodium hydroxide. The process of the invention will be further illustrated.

The term of "water permeability" of the fluorinated cation exchange membrane having carboxylic acid group as the ion-exchange group used in the specification means total amount of water permeated through the membrane in the electrolysis. The total amount of water permeated is caused by the electrosmosis, the osmotic pressure caused by difference of concentrations through the membrane and the kinetic pressure difference through the membrane.

The water permeability is shown by the unit of mole/Faraday. High current efficiency can be attained by using the flourinated cation exchange membrane having 2.1 to 3.3 especially 2.2 to 3.0 mole/Faraday of the water permeability within the above range.

The fluorinated cation exchange membranes having carboxylic acid groups as ion-exchange groups should have the above-mentioned characteristics in the electrolysis of an aqueous solution of sodium chloride. They need not have said specific water permeability in the condition of other than the electrolysis such as in water or in an aqueous solution of sodium chloride without electrolysis.

The fluorinated cation exchange membrane having carboxylic acid groups as ion-exchange groups and having said specific water permeability in the electrolysis can be produced by using various fluorinated copolymers. It is preferable to use a fluorinated copolymer having a specific ion-exchange capacity, a specific a glass transition temperature and a specific volumetric melt-flow rate because these properties relate to the water permeability and the characteristics of the membrane as stated below. The specific ion-exchange capacity of the fluorinated cation exchange membrane of the invention is preferably in a range of 0.5 to 4.0 meq/g dry polymer (milliequivalent/gram of dry polymer). When the ion-exchange capacity is less than said range, the electric resistance of the membrane is too high whereby the electrolytic cell voltage is disadvantageously high.

When the ion-exchange capacity is more than said range, the water permeability is disadvantageously high and the current efficiency is too low.

The membranes having an ion-exchange capacity of 0.7 to 2.5 meq/g dry polymer especially 0.9 to 2.0 meq/g dry polymer have especially excellent properties.

The glass transition temperature of the fluorinated copolymer for the cation exchange membrane is the important factor because it has close relation to the characteristic and the permeability of the membrane in the electrolysis.

It has been found that the glass transition temperature is preferably more than 20° C. especially 30° C. lower than the temperature in the electrolysis and is optimum less than 70° C. especially less than 60° C.

In said case, the cation exchange membrane imparts excellent current efficiency in the electrolysis.

The glass transistion temperature of the copolymer is dependent upon factor such as the combination of monomer, the ratio of components, the crosslinking degree and the ion-exchange capacity.

The glass transistion temperature of the copolymer can be controlled in said range by controlling above factor.

The molecular weight of the fluorinated copolymer for the cation exchange membrane is important because it relates to the tensile strength, the fabricapability, the water permeability and the electrical properties of the resulting fluorinated cation exchange membrane.

It is preferable to use the fluorinated copolymer having a molecular weight to give the volumetric melt flow rate of 100 mm$^3$/second at 150° to 300° C. preferably 160° to 270° C.

When the molecular weight is higher than said range, it is hard to fabricate a membrane having uniform thickness in the industrial scale.

On the other hand, when the molecular weight is lower than said range, the strength of the membrane is low and the current efficiency is decreased in ageing, disadvantageously.

Thus, a combination of monomers, a ratio of monomers and a condition of polymerization are selected so as to produce the copolymer having the temperature for the specific volumetric melt flow rate of 100 mm$^3$/second.

The fluorinated cation exchange membrane having carboxylic acid groups as the ion-exchange groups can be produced by using various fluorinated copolymers.

It is preferable to use monomers for forming the units (a) and (b) in the copolymers.

  (a)

  (b)

wherein x represents —F, —Cl, —H or —CF$_3$ and X' represents —F, —Cl, —H, —CF$_3$ or CF$_3$(CF$_2$)$_m$—; m represents an integar of 1 to 5 and Y represents —A, —$\phi$—A, —P—A, —O—(CF$_2$)$_{\overline{n}}$(P,Q,R)A; P represents $(CF_2)_{\overline{a}}(CXX')_{\overline{b}}(CF_2)_{\overline{c}}$; Q represents $(CF_2—O—CXX')_{\overline{d}}$; R represents $(CXX'—O—CF_2)_{\overline{e}}$; (P, Q, R) represents a discretional arrangement of at least one P, Q and R; $\phi$ represents phenylene group; X, X' are defined above; n=0 to 1; a, b, c, d and e represent 0 to 6; A represents —COOH or a functional group which can be converted to —COOH by hydrolysis or neutralization such as —CN, —COF, —COOR, —COOM, —CONR$_2$R$_3$; R$_1$ represents a C$_{1-10}$ alkyl group; M represents an alkali metal or a quaternary ammonium group and R$_2$ and R$_3$ respectively represent hydrogen atom or a $C_{1-10}$ alkyl group.

The typical groups Y have the structure having A connected to carbon atom which is connected to fluorine atom, and include

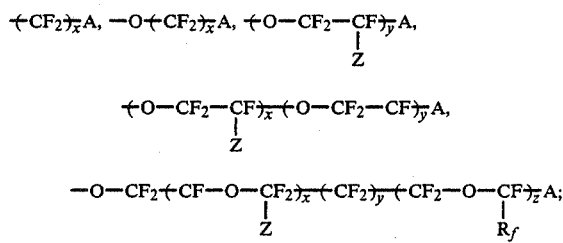

wherein x, y and z respectively 1 to 10; Z and $R_f$ respectively represent —F and a $C_{1-10}$ perfluoroalkyl group and A is defined above.

In the case of the copolymers having the units (a) and (b), it is preferable to have 1 to 40 mole % of the units (b) in order to produce the membrane having an ion-exchange capacity in said range.

In the production of the copolymer, it is possible to improve the property of the membrane by using more than one monomer or adding a third component of monomer.

Thus, it is possible to impart flexibility to the membrane by adding $CF_2=CFOR_f$ ($R_f$ a $C_{1-10}$ perfluoroalkyl group) or to impart high mechanical strength to the membrane under the coosslinkage of the copolymer by adding $CF_2=CF-CF=CF_2$, $CF_2=CFO(CF_2)_{1-4}OCF=CF_2$, etc.

The copolymerization of the fluorinated olefin monomer with a polymerizable monomer having carboxylic acid group or a functional group which can be converted to carboxylic acid group and a third component of monomer, can be attained by conventional desirable methods.

That is, the polymerization can be attained by a catalytic polymerization, a thermal polymerization, a radiation-induced polymerization, etc. if necessary using a solvent such as halogenated hydrocarbons.

The fabrication of the cationic exchange membrane by using the resulting copolymer can be attained by conventional methods such as a press molding method, a roller molding method, an extrusion molding method, a solution flow-spreading method, a dispersion molding method, a powder molding method, etc.

Thus, it is preferable to prepare the membrane having a thickness of 20 to 500 microns especially 50 to 400 microns.

When the copolymer has functional groups which can be converted to carboxylic acid group, the functional groups are converted to carboxylic acid group by a desired treatment before, during or after the fabrication of the membrane, especially after the fabrication.

When the functional groups are —CN, —COF, —COOR$_1$, or —CONR$_2$R$_3$ (R$_1$ to R$_3$ are defined above), the functional groups can be converted to carboxylic acid groups by a hydrolysis or neutralization with an alcoholic solution of an acid or a base. When the functional groups are double bonds, they can be converted to carboxylic acid group by reacting with COF.

The cation exchange membranes of the invention can be fabricated by blending a polyolefin such as polyethylene, polypropyrene; or a fluorinated polymer such as polytetrafluoroethylene, copolymer of ethylene and tetrafluoroethylene.

It is also possible to reinforce the copolymer by supporting the copolymer on a supporter made of said polymer in a form of cloth, net, non-woven fabric, porous film, etc.

The amount of the polymer used for the blend or the supporter is not considered in the calculation of the ion-exchange capacity.

Thus, the fluorinated cation exchange membrane having carboxylic acid groups as the ion-exchange group can be prepared.

The electric resistance of the membrane in the electrolysis is also important factor because it relates to the power consumption, and is preferably in a range of 0.5 to 10 $\Omega/cm^2$ especially 0.5 to 7 $\Omega/cm^2$. It is possible to employ the conventional diaphragmic electrolytic system for producing an alkali metal hydroxide by the electrolysis of an alkali metal chloride using the florinated cation exchange membrane. The electrolyte voltage and the current density are respectively in a range of 2.3 to 5.5 volts and 10 to 100 A/dm$^2$.

The anode used in the electrolysis can be graphite or anticorrosive electrode having stability in size which is made of a titanium substrate coated with a platinum group metal or an oxide of platinum group metal. The system of the electrolytic cell can be the monopolar system or the bipolar system.

Thus, in the case of the two compartment cell wherein the anolyte compartment and the catholyte compartment are formed by partitioning the anode and the cathode with the cation exchange membrane and aqueous solution of alkali metal chloride is fed in the anolyte compartment to electrolyze it, it is possible to produce sodium hydroxide having high concentration and hydrogen in catholyte compartment and chlorine in anolyte compartment.

The water permeability of the fluorinated cation exchange membrane of the invention is changed when electrolysis is conducted under abnormal condition.

Thus, it is preferable to electrolyze by maintaining the concentration of the aqueous solution of sodium chloride to 2.5 to 4.5 normal in the anolyte compartment and electrolyzing it at the current density of 10 to 50 A/dm$^2$ at 80° to 120° C.

In accordance with the process of the invention, sodium hydroxide can be produced in stable at high current efficiency of higher than 90%.

The process of the invention is not limited to the two compartment cell system, and can be attained by using the three compartment cell or the multi compartment cell wherein an anolyte compartment, a catholyte compartment and a middle compartment are formed by partitioning the anode and the cathode by using a plurality of the cation exchange membrane or the combination with the other cation exchange membrane or the other diaphragm.

A further understanding can be obtained by reference to certain specific examples which are provided herein for purposes of illustration only and are not intended to be limiting unless otherwise specified.

In the examples, an ion-exchange capacity of a cation exchange membrane is defined as follows.

A H-type cation exchange membrane was immersed into 1N-HCl at 60° C. for 5 hours to completely convert it to H-type membrane, and then the membrane was washed with water so as to be free of HCl.

Then 0.5 g of the H-type membrane was immersed into a solution prepared by adding 25 ml of water to 25 ml of 0.1N-NaOH to completely convert it to Na+ type membrane.

Then, the membrane was taken out and the amount of NaOH in the solution was measured by a back titration with 0.1N-HCl.

A water permeability of a cation exchange membrane was given by measuring total amount of water passed from the anolyte compartment through the membrane to the catholyte compartment in the electrolysis as unit of total amount of water per Faraday.

In practice, water permeability was calculated as follows.

$$\text{Water permeability} = \frac{\text{Increase of water included in sodium hydroxide in catholyte compartment} + \text{Water lost by electrolysis}}{\text{Quantity of electricity}}$$

The steam in the hydrogen gas generated in the catholyte compartment was condensed by a water cooling condenser, and the condensed water was recycled to the catholyte compartment.

An electric resistance is defined as follows.

Each potential difference between reference electrodes disposed in both sides of the membrane was measured at the time of current pass and at the time of no current pass.

$$\text{Electric resistance} = \frac{\text{Difference between potential difference at current pass and at no current pass}}{\text{Current density}}$$

A volumetric melt flow rate is defined as follows.

1 g of a sample of the copolymer is extruded through a nozzle having a diameter of 1 mm and a round of 2 mm under a predetermined pressure of 30 Kg/cm$^2$ at a predetermined temperature.

The volumetric melt flow rate is shown by the amount of polymer flowed in the unit of mm$^3$/second.

A glass transition temperature of the cation exchange membrane was measured by using scanning type differential thermal analyzer (Model DBC-2 manufactured by Perkin-Elmer Co.) as follows.

About 10 mg of a dried sodium type film sample was sealed at the center on a sample pan and was heated at a rate of 10° C./min.

EXAMPLE 1

An electrolysis of sodium chloride was carried out by using a carboxylic acid type fluorinated cation exchange membrane which was produced by a hydrolysis of a copolymer of tetrafluoroethylene and $CF_2=CFO(CF_2)_3COOCH_3$.

The ion-exchange capacity of the cation exchange membrane was 0.96 meq/g dried polymer.

The glass transition temperature Tg was 27° C. The volumetric melt flow rate of the methyl ester type copolymer was 100 mm$^3$/sec. at 210° C. The thickness of the membrane was 100$\mu$.

Two compartment type electrolytic cell was prepared by forming an anolyte compartment having an anode made of Rh-Ti and a catholyte compartment having a cathode made of stainless steel with a partition of the membrane.

Each of capillary tube was disposed near the membrane at each of the compartments and was connected to Ag/AgCl reference electrodes having a diaphragm made of $\phi$-Al$_2$O$_3$.

The anolyte compartment was filled with 3.6N-NaCl aq. solution and the catholyte compartment was filled with 8N-NaOH aq. solution. At the initiation of current pass 3.6N-NaCl aq. solution was fed through the capillary tube to the anolyte compartment at a rate of 0.96 liter per 1 Faraday (0.96 liter/Faraday).

0.1N-NaOH aq. solution was fed through the capillary tube to the catholyte compartment at a rate of 58.2 g/Faraday.

The anolyte compartment was heated by a heater to maintain at 86° C. and the current was passed at the current density of 20 A/dm$^2$ for the electrolysis.

After maintaining a constant concentration in the catholyte compartment, the data for the electrolysis were obtained.

As the result, 383.3 g of 10N-NaOH aq. solution was obtained by passing current of 3.101 Faradays.

In the catholyte compartment, 2.958 moles of sodium hydroxide was include. As the solution fed in the catholyte compartment contained 0.018 mole of sodium hydroxide, the sodium hydroxide resulted by the electrolysis was 2.940 moles. Accordingly, the current efficiency of sodium hydroxide was 94.8%.

On the other hand, the water permeation and the electric resistance of the cation exchange membrane used in the electrolysis were measured by the methods stated above to give 2.5 mole/Faraday and 2.2 $\Omega$-cm$^2$, respectively.

REFERENCE 1

In accordance with the process of Example 1 except using a carboxylic acid type fluorinated cation exchange membrane which was prepared by hydrolyzing a copolymer of tetrafluoroethylene and $CF_2=CFO(CF_2)_3COOCH_3$ which had the ion-exchange capacity of 1.42 meq/g dried polymer and the glass transition temperature Tg of 18° C. and the volumetric melt flow rate of 100 mm$^3$/sec. at 130° C. and the thickness of membrane of 150$\mu$, the electrolysis of sodium chloride was carried out.

As the result of the electrolysis, the current efficiency under the condition of the concentration of 6.9 normal of NaOH aq. solution formed in the catholyte compartment was 62.4%. On the other hand the permeability of the membrane was 6.23 mole/Faraday and the electric resistance of the membrane was 1.0 $\Omega$-cm$^2$.

EXAMPLE 2

An electrolysis of sodium chloride in two compartment type electrolytic cell was carried out by using a carboxylic acid type fluorinated cation exchange membrane which was prepared by a hydrolysis of a copolymer of tetrafluoroethylene and $CF_2=CFOCF_2CF(CF_3)OCF_2CF_2COOCH_3$ which had the ion-exchange capacity of the membrane of 0.92 meq/g-dried polymer, the volumetric melt flow rate of 100 mm$^3$/sec. at 170° C. under 30 kg/cm$^2$, and the glass transition temperature Tg of 0° C. and the thickness of membrane of 250$\mu$.

Two compartment type electrolytic cell was prepared by forming an anolyte compartment having an anode made of RuO$_2$—Ti and a catholyte compartment having a cathode made of iron with a partition of the membrane. Each of capillary tube was disposed near the membrane at each of the compartments, and was connected to Ag/AgCl reference electrodes having a diaphragm made of $\phi$-Al$_2$O$_3$.

The anolyte compartment was filled with 5.1N-NaCl aq. solution and the catholyte compartment was filled with 8N-NaOH aq. solution. At the initiation of current pass, 5.1N-NaCl aq. solution was fed through the capillary tube to the anolyte compartment and 0.1N-NaOH aq. solution was fed through the capillary tube to the catholyte compartment. The anolyte compartment was heated to maintain at 92° C. and the current was passed at the current density of 20 A/dm$^2$ for the electrolysis.. The electrolysis was carried out in the normal condition by maintaining the concentration of NaOH in the catholyte compartment to 35.0% under controlling the rate of 0.1N-NaOH aq. solution fed to the catholyte compartment.

In the normal condition, the concentration of sodium chloride in the anolyte compartment was 3.6 normal.

The amount of water added to the catholyte compartment was 1.97 mole per Faraday. The amount of water included in the resulting NaOH aq. solution was 3.82 mole per Faraday, and 35% NaOH aq. solution having a NaOH content of 0.934 mole per Faraday was overflowed.

In the solution fed in the catholyte compartment contained 0.0035 mole of sodium hydroxide, and accordingly, the current effeciency of sodium hydroxide was 93.0%.

On the other hand, the water permeation and the electric resistance of the cation exchange membrane used in the electrolysis were measured by the methods stated above to give 2.85 mole/Faraday and 2.1 Ω-cm$^2$, respectively.

EXAMPLE 3

An electrolysis of sodium chloride was carried out by using a carboxylic acid type fluorinated cation exchange membrane which was prepared by hydrolysis of a copolymer of tetrafluoroethylene and $CF_2=CFO(CF_2)_3COOCH_3$, which had the ion-exchange capacity of the membrane of 1.53 meq/g-dried polymer, the glass transition temperature Tg of 10° C., the volumetric melt flow rate of methyl ester type copolymer of 100 mm$^3$/sec. at 210° C. and the thickness of membrane of 300μ. The anolyte compartment was filled with 5.1N-NaCl aq. solution and the catholyte compartment was filled with 8N-NaOH aq. solution. At the initiation of current pass, 5.1N-NaCl aq. solution was fed through the capillary tube to the anolyte compartment at a rate of 0.96 liter/Faraday and 0.1N-NaOH aq. solution was fed through the capillary tube to the catholyte compartment at a rate of 31.6 g/Faraday. The catholyte compartment was heated to maintain at 95° C. and the current was passed at the current density of 20 A/dm$^2$ for the electrolysis. During 7 days after reaching 40% of the concentration of NaOH overflowed from the catholyte compartment in the normal condition, the solution overflowed was collected. As the results, the current density was 94.7%, the water permeation and the electric resistance were respectively 2.4 mole/Faraday and 2.6 Ω-cm$^2$.

REFERENCE 2

An electrolysis of sodium chloride was carried out by using a carboxylic acid type fluorinated cation exchange membrane which was prepared by a hydrolysis of a copolymer of tetrafluoroethylene and $CF_2=CFO(CF_2)_3COOCH_3$ which had the ion-exchange capacity of the membrane of 1.05 meq/g-dried polymer, the glass transition temperature Tg of 38° C., the volumetric melt flow rate of methyl ester type copolymer of 100 mm$^3$/sec. at 300° C. and the thickness of membrane of 100μ.

In accordance with the process of Example 3, the electrolytic test was carried out under maintaining the amount of 0.1N-NaOH aq. solution fed to the catholyte compartment to 49.7 g/Faraday. When the concentration of NaOH in the catholyte compartment was 37%, the current efficiency was 83.6%, the water permeability was 1.4 mole/Faraday and the electric resistance in the electrolysis was 13.9 Ω-cm$^2$.

REFERENCE 3

An electrolysis of sodium chloride was carried out by using a carboxylic acid type fluorinated cation exchange membrane which was prepared by hydrolysis of a copolymer of tetrafluoroethylene and $CF_2=CFO(CF_2)_3COOCH_3$ which had the ion-exchange capacity of the membrane of 1.52 meq/g dried polymer, the glass transition temperature Tg of 10° C., the volumetric melt flow rate of methyl ester type copolymer of 100 mm$^3$/sec. at 145° C. and the thickness of membrane of 250μ.

In accordance with the process of Example 3, the electrolytic test was carried out under maintaining the amount of 0.1N-NaOH aq. solution fed to the catholyte compartment to 1.1 g/Faraday. When the concentration of NaOH in the catholyte compartment was 40%, the current efficiency was 85.9%, the water permeability was 3.7 mole/Faraday and the electric resistance in the electrolysis was 1.5 Ω-cm$^2$.

EXAMPLE 4

An electrolysis of sodium chloride was carried out by using a carboxylic acid type fluorinated cation exchange membrane which was prepared by hydrolysis of a copolymer of tetrafluoroethylene and $CF_2=CFO(CF_2)_3COOCH_3$ and $CF_2=CFOC_3F_7$ which had the ion exchange capacity of 1.22 meq/g-dried polymer and the glass transition temperature Tg of 8° C., the volumetric melt flow rate of methyl ester type copolymer of 100 mm$^3$/sec. at 180° C., and the thickness of membrane of 200μ.

In accordance with the process of Example 3, the electrolytic test was carried out under maintaining the amount of 0.1N-NaOH aq. solution fed to the catholyte compartment to 24.9 g/Faraday.

When the concentration of NaOH in the catholyte compartment was 40%, the current efficiency was 94.5%, the water permeability was 2.5 mole/Faraday and the electric resistance in the electrolysis was 3.5 Ω-cm$^2$.

EXAMPLE 5

An electrolysis of sodium chloride was carried out by using a carboxylic acid type fluorinated cation exchange membrane which was prepared by hydrolysis of a copolymer of tetrafluoroethylene and $CF_2=CFCOOCH_3$ which had the ion exchange capacity of 1.34 meq/g-dried polymer and the glass transition temperature Tg of 33° C., the volumetric melt flow rate of methyl ester type copolymer of 100 mm$^3$/sec. at 220° C. and the thickness of membrane of 200μ.

In accordance with the process of Example 3, the electrolytic test was carried out under maintaining the amount of 0.1N-NaOH aq. solution fed to the catholyte compartment to 27.1 g/Faraday. When the concentration of NaOH in the catholyte compartment was 35%, the current efficiency was 91.5%, the water permeability was 2.8 mole/Faraday and the electric resistance in the electrolysis was 3.1 $\Omega\text{-cm}^2$.

What is claimed is:

1. In a method of subjecting an aqueous sodium chloride solution to electrolysis to produce chlorine and sodium hydroxide in an electrolysis cell which is partitioned by a diaphragm into an anolyte compartment and catholyte compartment, the improvement which comprises a diaphragm which is a fluorinated polymeric cation exchange membrane having a water permeability under electrolysis conditions of from 2 to 3.5 moles/Faraday; and containing carboxylic acid groups as the ion exchange groups.

2. The method of claim 1, wherein said fluorinated cation exchange membrane is a fluorinated polymer having an ion-exchange capacity of 0.5 to 4.0 milliequivalent/gram dried polymer and a glass transition temperature at least 20° C. lower than the temperature of electrolysis.

3. The method of claim 1 wherein said fluorinated polymer has a volumetric melt flow rate of 100 $\text{mm}^3$/second at 150° to 300° C.

4. The method of claim 1, wherein said fluorinated cation exchange membrane has an electric resistance of less than 10 $\Omega\text{-cm}^2$ under the electrolysis conditions.

5. The method of claim 1, wherein said fluorinated polymer is a copolymer produced by copolymerizing a fluorinated olefin monomer and a monomer containing carboxylic acid groups or functional groups which can be converted to carboxylic acid groups.

6. The method of claim 5, wherein the fluorinated copolymer comprises repeating units of the formula:

 (a)

and $$\text{+CF}_2\text{—C—X''+} \quad (b)$$
$$\quad\quad\quad | $$
$$\quad\quad\quad Y$$

wherein X represents —F, —Cl, —H or —$CF_3$; X' and X" respectively represent —F, —Cl, —H, —$CF_3$ or —$(CF_2)_m CF_3$; m is 1 to 5; Y represents —A, —φ—A, —P—A, —O—$(CF_2)_n$(P,Q,R)A and P represents $+CF_2\overline{)_a}(CXX')_b\overline{(CF_2)_c}$; Q represents $(CF_2—O—CXX')_d$; R represents $+CXX'—O—CF_2\overline{)_e}$ and (P, Q, R) represents an arrangement of at least one P, Q and R in desired order; φ represents a phenylene group; X and X' are defined above; n is 0 or 1; a, b, c, d, and e respectively 0 to 6; A represents —COOH or a functional group which can be converted to —COOH selected from the group consisting of —CN, —COF, —$COOR_1$, —COOM, and —$CONR_2R_3$; $R_1$ represents a $C_{1\text{-}10}$alkyl group; M represents an alkali metal or a quaternary ammonium group and $R_2$ and $R_3$ respectively represent hydrogen atom or a $C_{1\text{-}10}$alkyl group.

7. The method of claim 6 wherein Y is selected from the group consisting of

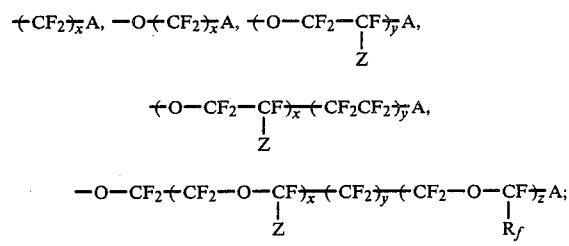

wherein x, y and z respectively 1 to 10; Z and $R_f$ respectively represent —F and a $C_{1\text{-}10}$perfluoroalkyl group, A is as defined in claim 6.

8. The method of claim 6 wherein repeating unit (b) comprises from 1 to 40 mole % of the total polymer.

9. The method of claim 6, wherein repeating unit (b) comprises from 3 to 20 mole % of the total copolymer.

* * * * *